(12) United States Patent
Schoell

(10) Patent No.: US 12,065,984 B2
(45) Date of Patent: Aug. 20, 2024

(54) BIOMASS ENERGY GENERATOR SYSTEM

(71) Applicant: Harry Schoell, Longview, TX (US)

(72) Inventor: Harry Schoell, Longview, TX (US)

(*) Notice: Subject to any disclaimer, the term of this patent is extended or adjusted under 35 U.S.C. 154(b) by 0 days.

(21) Appl. No.: 18/241,807

(22) Filed: Sep. 1, 2023

(65) Prior Publication Data

US 2024/0077045 A1 Mar. 7, 2024

Related U.S. Application Data

(60) Provisional application No. 63/403,101, filed on Sep. 1, 2022.

(51) Int. Cl.
| | |
|---|---|
| *F02G 1/02* | (2006.01) |
| *F01B 17/04* | (2006.01) |
| *F01D 15/10* | (2006.01) |
| *F01K 3/02* | (2006.01) |
| *F22B 1/00* | (2006.01) |
| *F24S 10/40* | (2018.01) |

(52) U.S. Cl.
CPC ............... *F02G 1/02* (2013.01); *F01B 17/04* (2013.01); *F01D 15/10* (2013.01); *F01K 3/02* (2013.01); *F22B 1/006* (2013.01); *F24S 10/45* (2018.05)

(58) Field of Classification Search
CPC . F02G 1/02; F01B 17/04; F01D 15/10; F01K 3/02; F22B 1/006; F24S 10/45
See application file for complete search history.

(56) References Cited

U.S. PATENT DOCUMENTS

| | | | |
|---|---|---|---|
| 4,414,813 | A | 11/1983 | Knapp |
| 5,341,637 | A | 8/1994 | Hamrick |
| 6,021,743 | A | 2/2000 | Bauer |
| 6,672,259 | B2 | 1/2004 | Blomberg |
| 7,246,492 | B2 | 7/2007 | Hendrix et al. |
| 7,937,948 | B2 | 5/2011 | Zubrin et al. |
| 8,343,242 | B2 | 1/2013 | Geest et al. |
| 8,505,300 | B2 | 8/2013 | Thiessen |
| 8,544,273 | B2 | 10/2013 | Brenmiller et al. |
| 8,596,034 | B2 | 12/2013 | Shortlidge et al. |
| 9,909,496 | B2 | 3/2018 | Chen et al. |

FOREIGN PATENT DOCUMENTS

| | | | | |
|---|---|---|---|---|
| CN | 201730779 U | * | 2/2011 | |
| GB | 2544977 A | * | 6/2017 | ............... B60K 6/00 |
| WO | WO-2013087949 A1 | * | 6/2013 | ............... F01K 13/00 |

* cited by examiner

*Primary Examiner* — Audrey B. Walter
(74) *Attorney, Agent, or Firm* — Malloy & Malloy, P.L.; Robert M. Downey

(57) ABSTRACT

A multi-fuel microgrid class generator system includes a heat regenerative steam engine that provides a versatile power source having a clean burn using liquid fuel or biomass for generating electricity. The generator system is also capable of using wind energy and/or solar energy that is converted to heat and stored in a thermal storage unit using a heat exchange medium, such as carbon/graphite. The heat regenerative steam engine uses these various power sources to generate up to 1 megawatt of clean and cost-effective electricity.

1 Claim, 7 Drawing Sheets

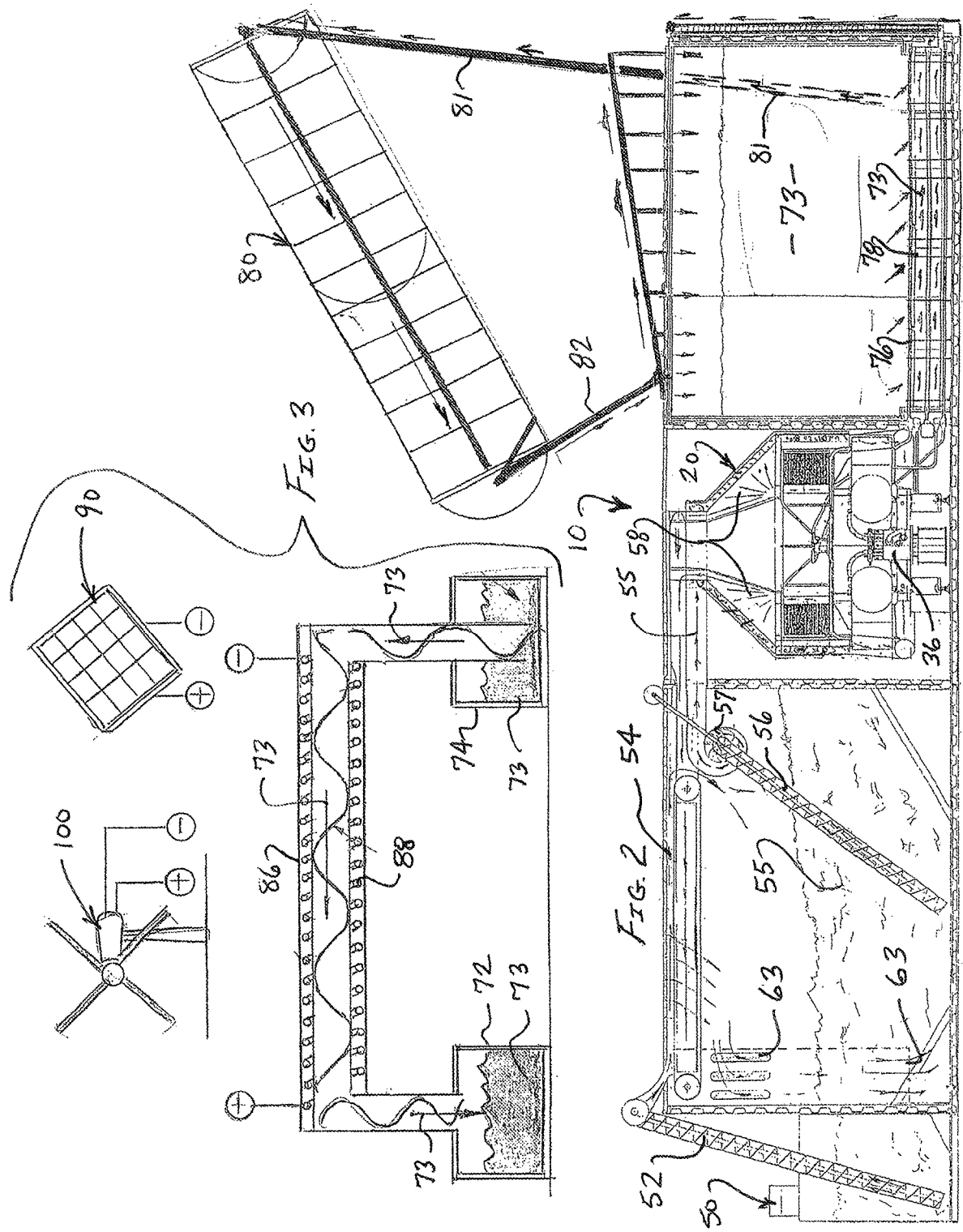

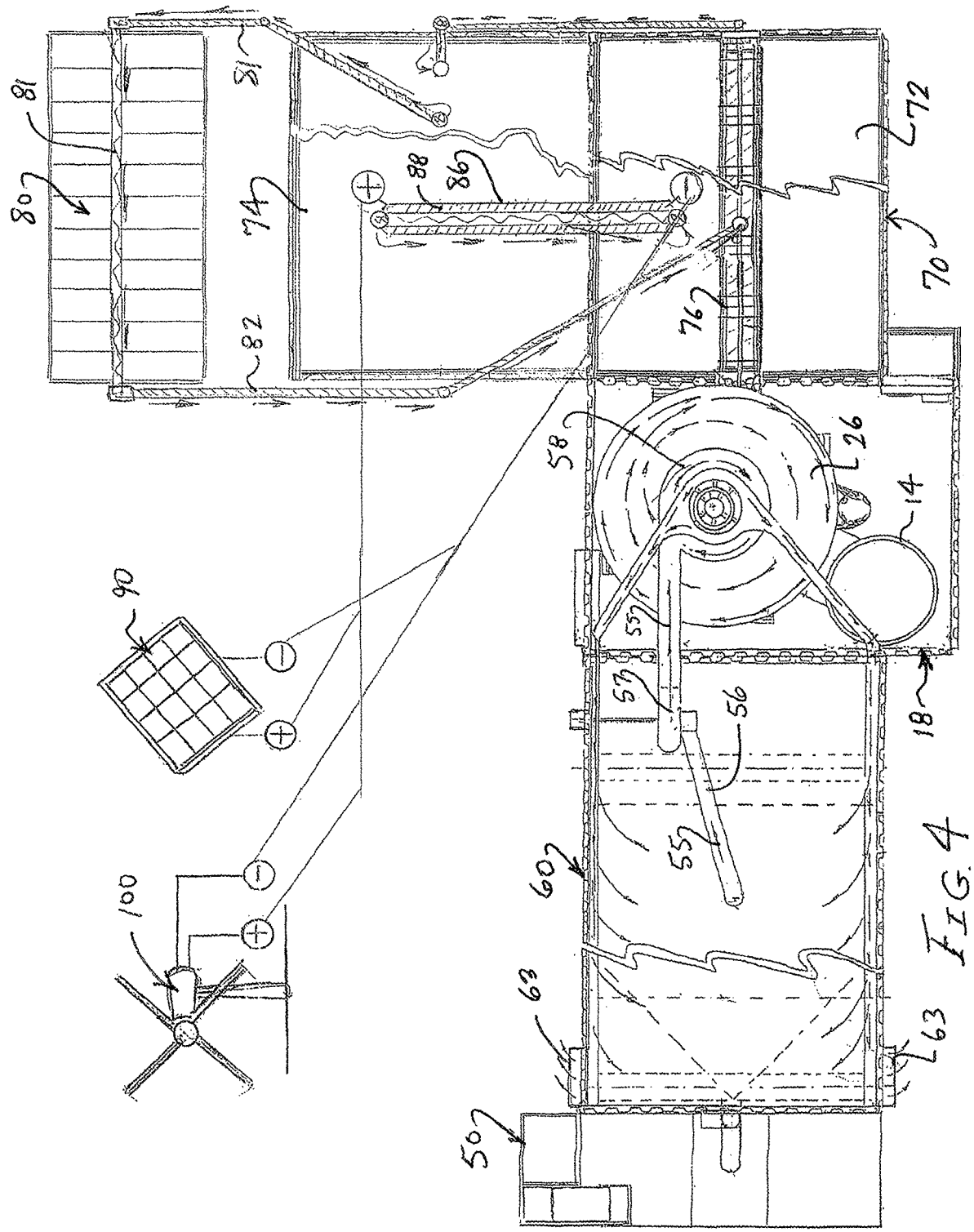

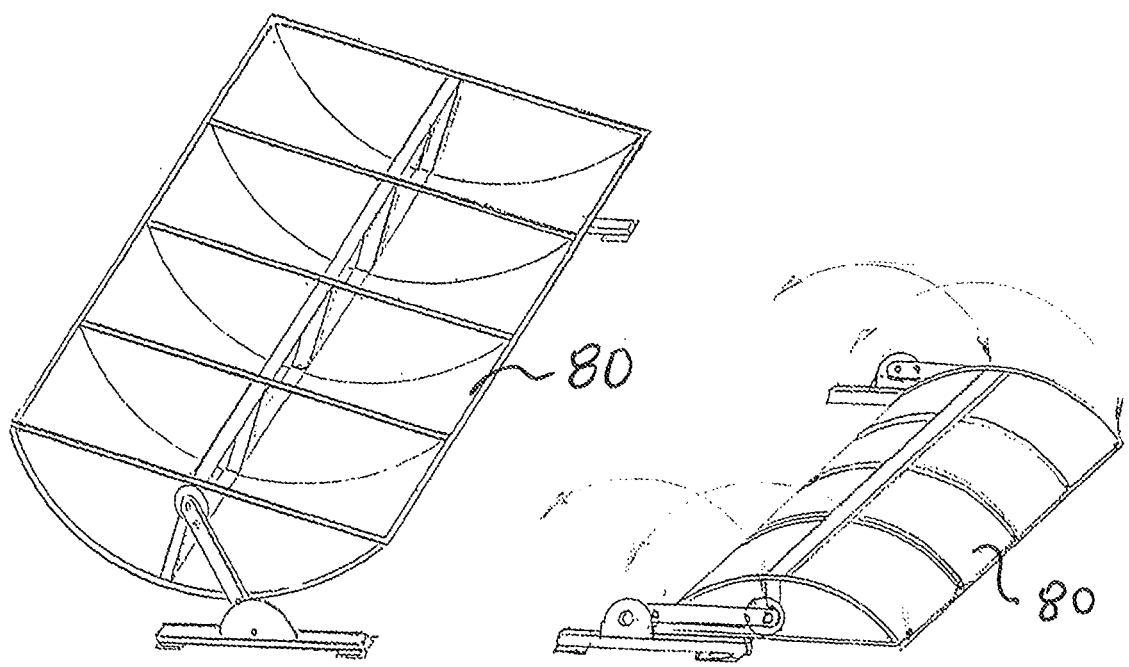

BIOMASS ENERGY GENERATOR SYSTEM

BACKGROUND OF THE INVENTION

This non-provisional patent application is based on provisional patent application Ser. No. 63/403,101 filed on Sep. 1, 2022.

FIELD OF THE INVENTION

This invention relates to generator systems for producing electric power and, more particularly, to a microgrid class generator system for generating electricity and providing a versatile engine power source that operates on a variety of liquid fuels, biomass, wind energy and solar energy, and further including a thermal storage unit for storing heat generated by the wind and solar energy.

DESCRIPTION OF THE RELATED ART

Typical electric power generator systems are fueled by various liquid and gaseous fuels including diesel, propane, and gasoline. It has also been known to use various thermal oils as a heat transfer fluid when combined with solar energy systems, while other power generated systems have proposed use of various chemicals and solids for the purpose of storing heat, however they have proved to be inefficient. The present invention provides the only known multi-fuel microgrid class generator system that is powered by any of a variety of energy sources including liquid fuels, biomass, wind energy and solar energy. Moreover, the energy generator system of the present invention provides a unique thermal storage unit for storing heat resulting from the conversion of wind energy and solar energy, thereby providing a fuel source to operate the generator system and generate electricity 24 hours a day. The thermal storage unit stores the heat energy in a heat exchange medium, such as carbon/graphite. This heat exchange medium has proven to be far more efficient and effective than thermal oils, other chemicals and various solids used in prior art thermal storage units and electric power generator systems.

OBJECTS AND ADVANTAGES OF THE INVENTION

With the foregoing in mind, it is a primary object of the present invention to provide a multi-fuel microgrid class generator system that can generate up to 1 megawatt of clean and cost-effective electricity.

It is a further object of the present invention to provide a highly efficient generator system with a multi-fuel steam engine that provides for heat regeneration and which operates at or near super critical pressure (3,200 lbs.) and high temperature (1,200 degrees Fahrenheit).

It is still a further object of the present invention to provide a highly efficient and compact microgrid class generator system that is environmentally friendly, using external combustion, a cyclone burner and water lubrication.

It is still a further object of the present invention to provide a highly efficient generator with a compact steam engine that has multi-fuel capacity, allowing the engine to burn any of a variety of fuel sources including liquid fuels and biomass and combinations thereof.

It is still a further object of the present invention to provide a highly efficient electric power generator system that includes a thermal storage unit for holding heat from converted solar energy and/or wind energy and for using the stored heat to generate steam to power the steam engine in the generator.

These and other objects and advantages of the present invention are more readily apparent with reference to the detailed description and accompanying drawings.

SUMMARY OF THE INVENTION

The present invention is directed to a multi-fuel microgrid class generator system that includes a generator powered by a heat regenerative steam engine that provides a versatile power source having a clean burn using liquid fuel or biomass (i.e., organic matter such as wood, plants and garbage) for generating electricity. The generator system may also use wind energy and/or solar energy that is converted to heat and stored in a thermal storage unit (TSU). The heat regenerative steam engine uses these power sources to operate the generator and to generate up to 1 megawatt of clean and cost-effective electricity.

The energy generator system includes a wood chipper, a biomass storage compartment, the heat regenerative engine and generator, and the thermal storage unit along with a solar trough for capturing solar energy that is converted to heat and stored in the TSU. The wood chipper receives biomass and chops it into smaller pieces that are then led to a dryer conveyor to remove moisture. The biomass is stored in the biomass storage compartment until it is eventually burned within the heat regenerative engine. The thermal storage unit includes a tank that is used for storing the heat energy in a heat exchange medium, such as carbon/graphite. The thermal storage unit heat exchanger allows the heat exchange medium to be pulled through a transfer conduit surrounded by multiple rows of tubing containing water/steam that powers the heat regenerative engine. The medium is pulled through the transfer conduit by an auger where it is sent to the thermal storage unit cold tank. Steam manifolds tie the multiple water/steam tubes to a line system that leads to the cylinders of a rotary valve in the heat regenerative engine. The thermal storage unit auger system is used in multiple places to move the powdered heat exchange medium (e.g., powdered carbon and/or graphite) through conduits inside the hot and cold tanks of the thermal storage unit, as well as through a solar trough for the purpose of heat exchange.

BRIEF DESCRIPTION OF THE DRAWINGS

For a fuller understanding of the nature of the present invention, reference should be had to the following description taken in connection with the accompanying drawings in which:

FIG. 2 is a side elevational view, in cross-section, illustrating the power generator of the present invention;

FIG. 3 is an isolated side elevational view, shown in cross-section, and illustrating an auger transfer and heat exchanger for moving a heat storage medium for a cold storage tank to a hot storage tank and heating the medium while moving through the auger system;

FIG. 4 is a top plan view, in partial cross-section, illustrating the power generator of the present invention, and including the hot storage tank and the cold storage tank, as well as a solar trough;

FIG. 9 is a perspective view showing a solar trough in a raised, operable position; and FIG. 10 is a perspective view showing the solar trough in a collapsed, stowed position.

Like reference numerals refer to like parts throughout the several views of the drawings.

DETAILED DESCRIPTION OF THE PREFERRED EMBODIMENT

Figure 1:
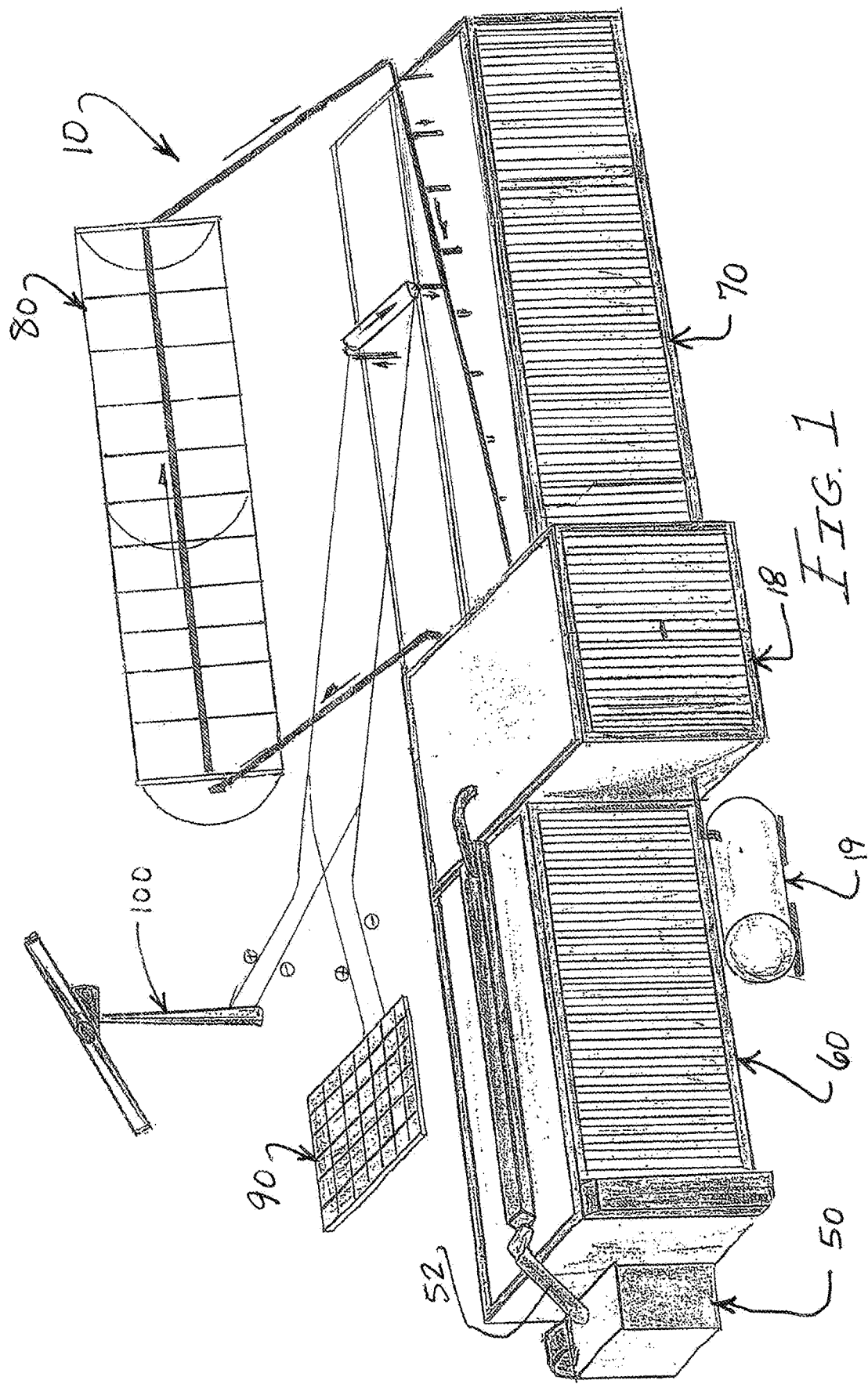
FIG. 1 is a front top perspective view of the power generator system of the present invention showing the primary components thereof.
Figure 5:
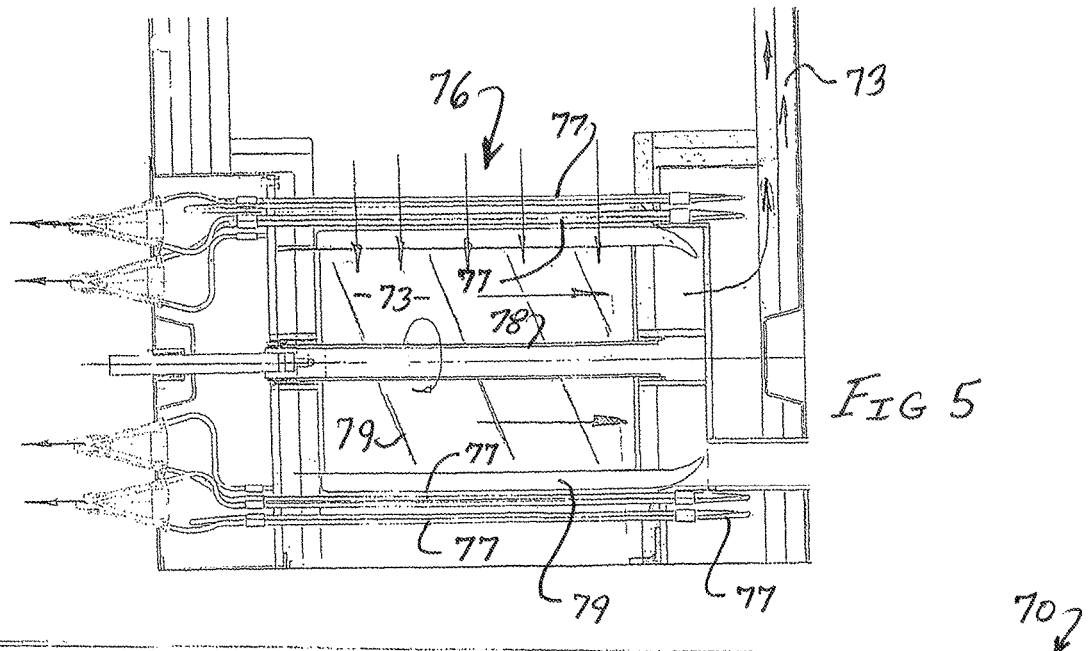
FIG. 5 is an isolated view, in partial cross-section, showing a heat exchanger arrangement in the hot storage tank of the thermal storage unit.
Figure 6:
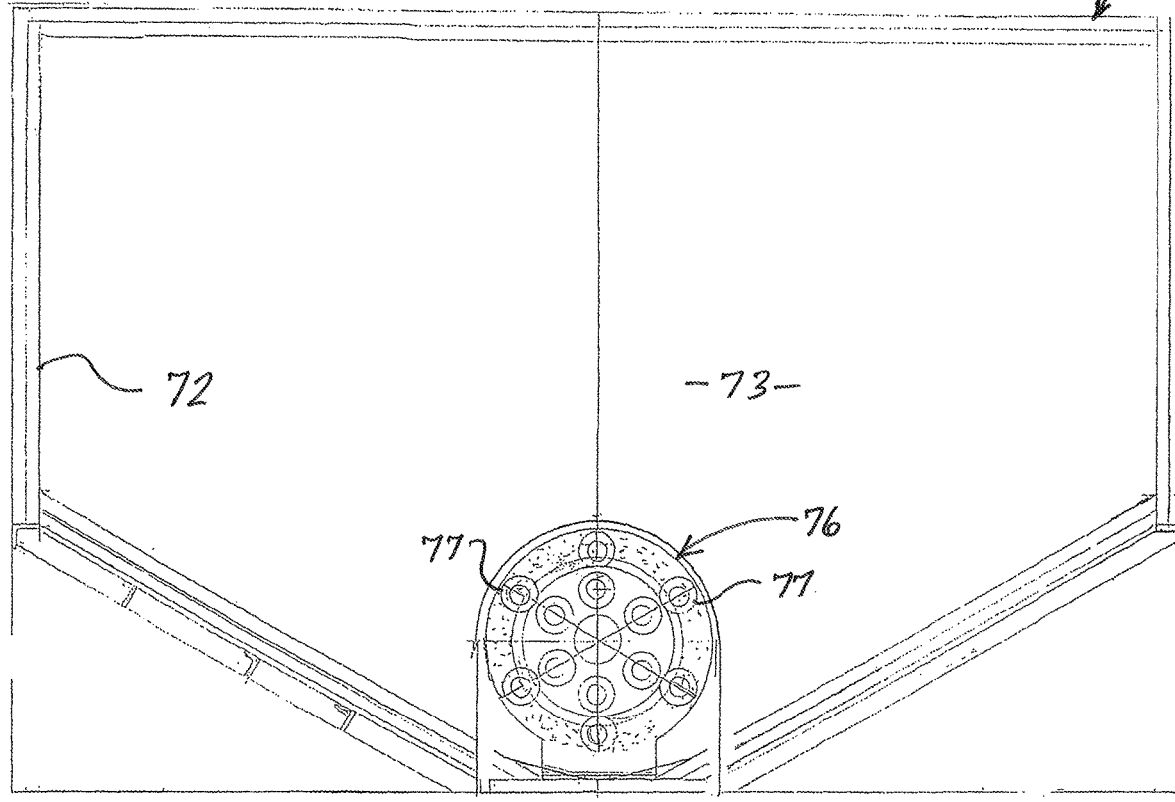
FIG. 6 is an end elevational view, shown in partial cross section, illustrating a hot thermal storage unit container and heat exchanger in accordance with one embodiment of the present invention.

Referring initially to FIG. 1, the energy generator system of the present invention is shown and is generally indicated as 10 throughout the drawing figures. The energy generator system 10 includes a woodchipper 50, a biomass storage compartment 60, a heat regenerative engine within an engine compartment 18, and a thermal storage unit 70 with a solar trough 80. The energy generator system 10 is a multi-fuel system that allows for a versatile power source that can be fueled by liquid fuel or biomass (e.g., wood, plants, household and restaurant garbage, and other organic matter) for the purpose of generating electricity.

Referring to FIGS. 2 and 4, the woodchipper 50 receives biomass and chops it into smaller pieces that are led by a feed auger 52 to a dryer conveyor 54 to remove moisture. The dried biomass 55 is then dropped into the larger storage compartment 60. The biomass is stored in the biomass storage compartment 60 until it is eventually burned within the heat regenerative engine 20. At least one fuel tank 19 contains one or more liquid fuel types (e.g., gasoline, diesel, kerosene, ethanol, biodiesel) that are pumped to a combustion chamber 26 of the heat regenerative engine 20 and burned to generate heat. The dried biomass 55 is picked up by the engine feed auger 56 and delivered to a high-speed slinger 57 to increase the velocity of the dried, ground biomass into the combustion chamber dryer 58 of the heat regenerative engine. The bottom side of the combustion chamber dryer is then heated by the engine exhaust heat of the heat regenerative engine. The swirling and heated biomass 55 is then directed into the combustion chamber 26. In addition, wind and solar energy is converted to heat and stored in the Thermal Storage Unit (TSU) 70. The heat regenerative engine 20 uses these power sources to operate generator 14 that can generate up to 1 megawatt of clean and cost-effective electricity.

Figure 7:
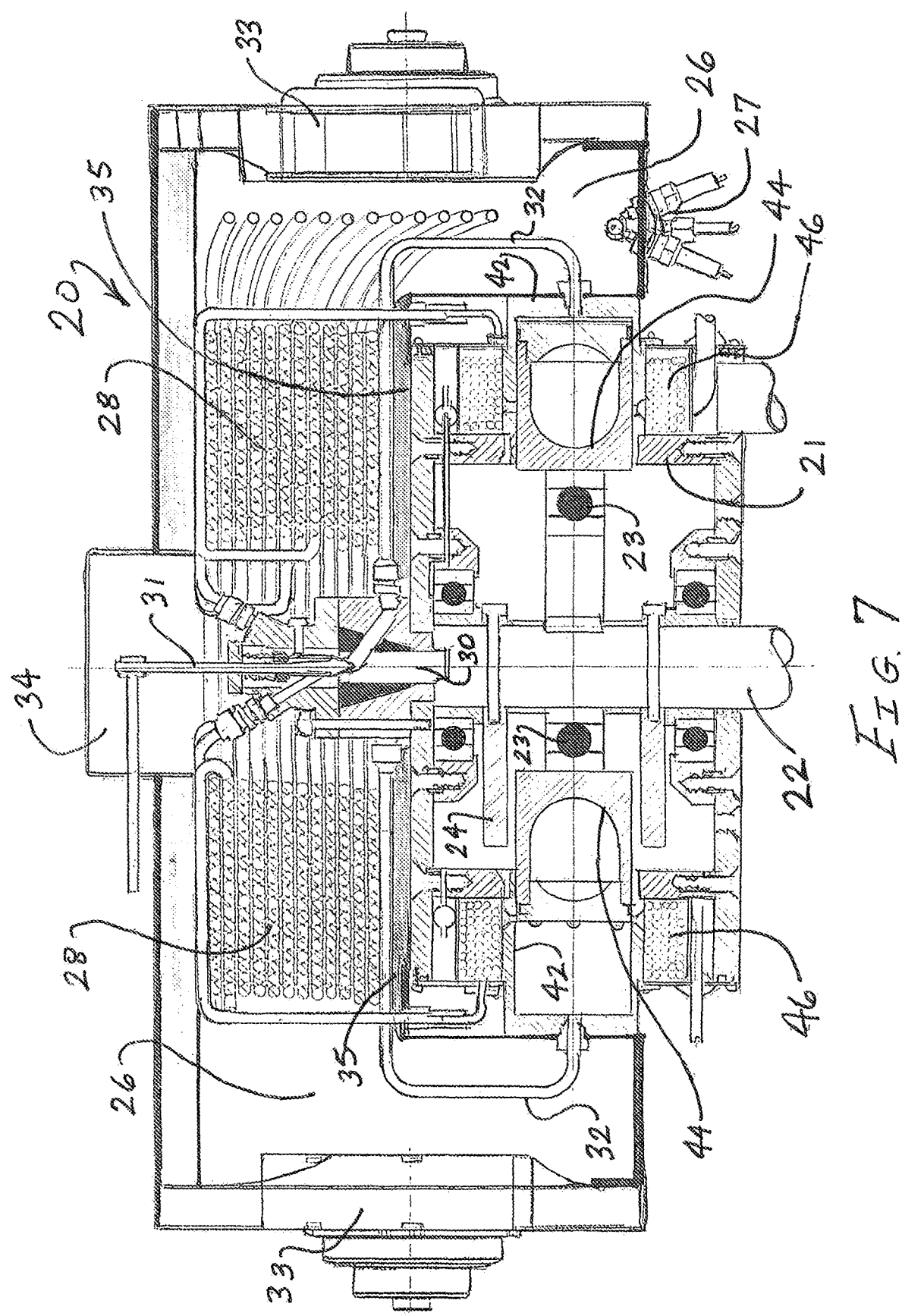
FIG. 7 is a side elevational view, shown in cross-section, of a heat regenerative steam engine used in the power generator system.

Referring to FIG. 7, the heat regenerative steam engine is shown in cross-section and generally indicated as 20. The heat regenerative steam engine 20 includes an engine block 21, a crank shaft 22 that is rotatably driven by operation of the engine, throw bearings 23 that are used in a bearing race of a rotary valve arrangement for rotating the crank shaft and counterweights 24 for balancing the crank shaft 22. A rotary valve 40 in the engine 20 includes cylinders 42 arranged in a radial configuration and reciprocating hollow pistons 44 therein. The steam engine 20 further includes a combustion chamber 26 and an ignitor 27 for igniting liquid fuel within the combustion chamber 26. A heat exchanger 28 in the steam engine 20 generates steam within steam tubes for delivering to the cylinders 42 of the rotary valve 40 for moving the pistons 44 within the cylinders 42. The cylinders have an arrangement of preheater coils 46 surrounding at least a portion on the cylinders which are preheated by exhaust steam exiting the cylinders. Steam lines 32 are directed from a valve 30 and throttle 31 arrangement for injecting steam into the cylinders 42. The engine further includes combustion blowers 33 for circulating the burning fuel within the combustion chamber. An exhaust 34 exhausts the heat from combustion which is directed to the biomass dryer conveyor 54, as described hereinafter. A layer of insulation 35 is provided between the heat exchanger 28 and the engine block. Final wet exhaust dumps out of the side vents 63 of the biomass container (see FIG. 2) where the water filters out impurities. A control panel monitors the temperature, pressure and RPMs of the heat regenerative steam engine 10, while also monitoring the auger rotation and other necessary controls.

Water in its delivery path from a condenser sump pump 36 to the combustion chamber 26 is pumped through one or more main steam supply lines 32 for each cylinder. The main steam line passes through a preheating coil 46 that is wound around each cylinder skirt 42 adjacent to that cylinder's exhaust ports 45. The vapor exiting the exhaust ports 45 gives up heat to this coil 46, which raises the temperature of the water being directed through the coil toward the combustion chamber 26.

In the next phase, the air is directed through heat exchangers 28 where the air is heated prior to entering the combustion chamber 26. In the combustion chamber 26, the preheated air is mixed with fuel from a fuel atomizer. An igniter 27 burns the atomized fuel in a centrifuge, causing the heavy fuel elements to move towards the outer sides of the combustion chamber 26 where they are consumed. The combustion chamber 26 is arranged in the form of a cylinder which encloses a circularly wound coil of densely bundled tubes in the heat exchanger 28 forming a portion of the steam supply lines 32 leading to the respective cylinders 42. The bundled tubes are heated by the burning fuel of the combustion chamber with the flames moving in a spiral direction. By spinning the flame front around the combustion chamber 26, the coil of tubes is repetitively 'washed' by the heat of this combustion gas which circulates in a motion to the center of the tube bundle. Temperatures in the tube bundle are maintained at approximately 1,200 degrees Fahrenheit. The tube bundle in the heat exchanger 28 carries the steam and is exposed to the high temperatures of combustion, where the steam is superheated and maintained at a pressure of approximately 3,200 psi. The hot gas exits through the top exhaust 34 of the cylindrical combustion chamber. The centrifugal motion of the combustion gases causes the heavier, unburned particles suspended in the gases to accumulate on the outer wall of the combustion chamber where they are incinerated, contributing to a cleaner exhaust. This cyclonic circulation of combustion gases within the combustion chamber creates higher efficiency in the engine. Specifically, multiple passes of the coil of tubes allows for promoting greater heat saturation relative to the amount of fuel expended. Moreover, the shape of the circularly wound bundle of tubes permits greater lengths of tube to be enclosed within a combustion chamber of limited dimensions than within that of a conventional boiler. Furthermore, by dividing each cylinder's steam supply line into two or more lines at entry to the combustion chamber (i.e.

in the tube bundle), a greater tube surface area is exposed to the combustion gases, promoting greater heat transfer so that the fluid can be heated to higher temperatures and pressures which further improves the efficiency of the engine.

Referring to FIG. 4, the TSU is a container 70 of two parts. One part, a hot tank 72, stores a hot heat exchange medium 73 (see FIG. 2), and the other part, a cold tank 74, is a cooler container where the medium 73 is moved after heat has been extracted. A heat exchanger 76 in the hot tank includes a series of small diameter tubes 77 that contain water are plumbed in a back and forth arrangement in the TSU hot tank 72, and the heat exchange medium 73 flows through a conduit 78 surrounding the outside of the tubes. The medium is moved from one end of the conduit to the other by way of an expanding pitch auger 79 to even out the flow of the medium 73 as it is exposed to the total outside surface area of the tubes 77. When the heat exchange medium 73 reaches the end, a majority of the heat has been transferred to the water in the tubes 77. From this end of the TSU hot tank 72, the cooler medium 73 is now moved by a smaller standard type auger 75 to a cold storage tank to be recycled through the system. The water in the tube heat exchanger is now converted to steam and a high-pressure pump is used to pump the high-pressure high temperature steam back to the heat regenerative engine 20 to run the engine generator and generate electricity.

Referring to FIGS. 1, 2, 4, 9 and 10, the biomass generator may include a solar trough 80 for capturing solar heat energy. The solar trough 80 is a parabolic trough of unique construction and high efficiency with the ability to withstand bad weather and storms. The parabola is almost semicircular to have the apex of the focus within the parabola. A normal sun tracker is used for this trough to follow the sun. It is operated by a motorized gear or belt drive to rotate the trough following the sun. A unique tilt mechanism on each end of the trough allows it to lay down flat to avoid storm conditions. A timer-controlled motor raises the trough in the morning and moves it back down at dusk. The solar trough may include a longitudinal brush that is rotated inside in the trough for cleaning.

The solar trough 80 includes an apex heater that is composed of a double layer of heat resistant glass with a vacuum between. This is normal for water heating, however, this type of system is limited to low pressure and temperature where heat exchange is done by radiant heat passing through the vacuum then transferring through the black inner glass with a phase change to conductive heat transfer to the liquid.

This new and unique system can operate at very high temperatures up to 1,400 degrees Fahrenheit by using a highly conductive black fluid instead of water. The radiant heat is directly transferred through the vacuum tubes to the black fluid substance for high thermal efficiency. This black fluid substance is moved through the tube using a motorized rotating auger with a center metal filler tube causing a smaller volume of material close to the radiant heat exposure, also adding a turbulent condition for better heat transfer. The speed of the auger is controlled by a thermocouple at the end. There is a smaller eyebrow parabola that covers the outside of the apex. This is for storm protection and reflector for radiant heat that could skip off the outer tube.

The frame construction of the solar trough is of aluminum alloy with bent frames following the parabola. Longitudinal supports are assembled with screws, and a few welds. The parabola bent frames allow for the use of a thermoplastic sheet to lay into the trough frames and give a large tubular support. These panels are covered with a reflective Mylar material. The thermoplastic material has a natural impact resistance from storm damage. If damage does occur, the panel is easily replaced. A cross tie of tension cables eliminates any twisting moments to stiffen the solar trough. A slot at the center line of the parabola allows air pressure release to stabilize the system in wind conditions.

As seen in FIG. 4, the solar trough is used in conjunction with the thermal storage unit for heating the heat exchange medium 73. As previously noted, in one preferred embodiment, the heat exchange medium is a powdered blend of carbon and graphite or just powdered carbon or powdered graphite alone. It is contemplated that other suitable materials having excellent heat exchange properties may be used in the invention. The heat exchange medium 73 is moved from the cold tank 74 by feed auger 81 allowing the heat exchange medium 73 to move through the solar trough 80 where the heat exchange medium 73 is heated to sufficiently high temperatures. A hot auger feed 82 on an opposite end of the solar trough returns the heated heat exchange medium 73 to the hot tank 72 where it is used to heat the water within the tubes 77 of the TSU heat exchanger 76.

Referring to FIGS. 3 and 4, a further means of heating the heat exchange medium 73 is shown, wherein the heat exchange medium is directed from the cold tank 74 to the hot tank 72 while passing through a heated auger 86 that is surrounded by an electric heating element 88. As the heat exchange medium 73 passes through the auger 86, the medium 73 is heated by the electric heating element 88 and directed into the hot tank 72 for use to generate steam for the engine 20, as described above. The heating element 88 surrounding the auger 86 may be electrically powered by a photovoltaic cell panel (PV panel) 90 or a windmill 100, as indicated in FIGS. 3 and 4.

Referring to FIG. 2, the feed auger 52 picks up the chopped biomass from a storage compartment of the chipper 50 and directs the chopped biomass over a dryer conveyor 54 to remove moisture from the biomass. The dried biomass 55 is then dropped into the larger storage compartment 60. From the storage compartment, the dried biomass 55 is picked up by the engine feed auger 56 and delivered to a high-speed slinger 57 to increase the velocity of the dried, ground biomass into the combustion chamber dryer 58 of the heat regenerative engine. The bottom side of the combustion chamber dryer is then heated by the engine exhaust heat of the heat regenerative engine. The swirling and heated biomass 55 is then directed into the combustion chamber 26.

Figure 8:
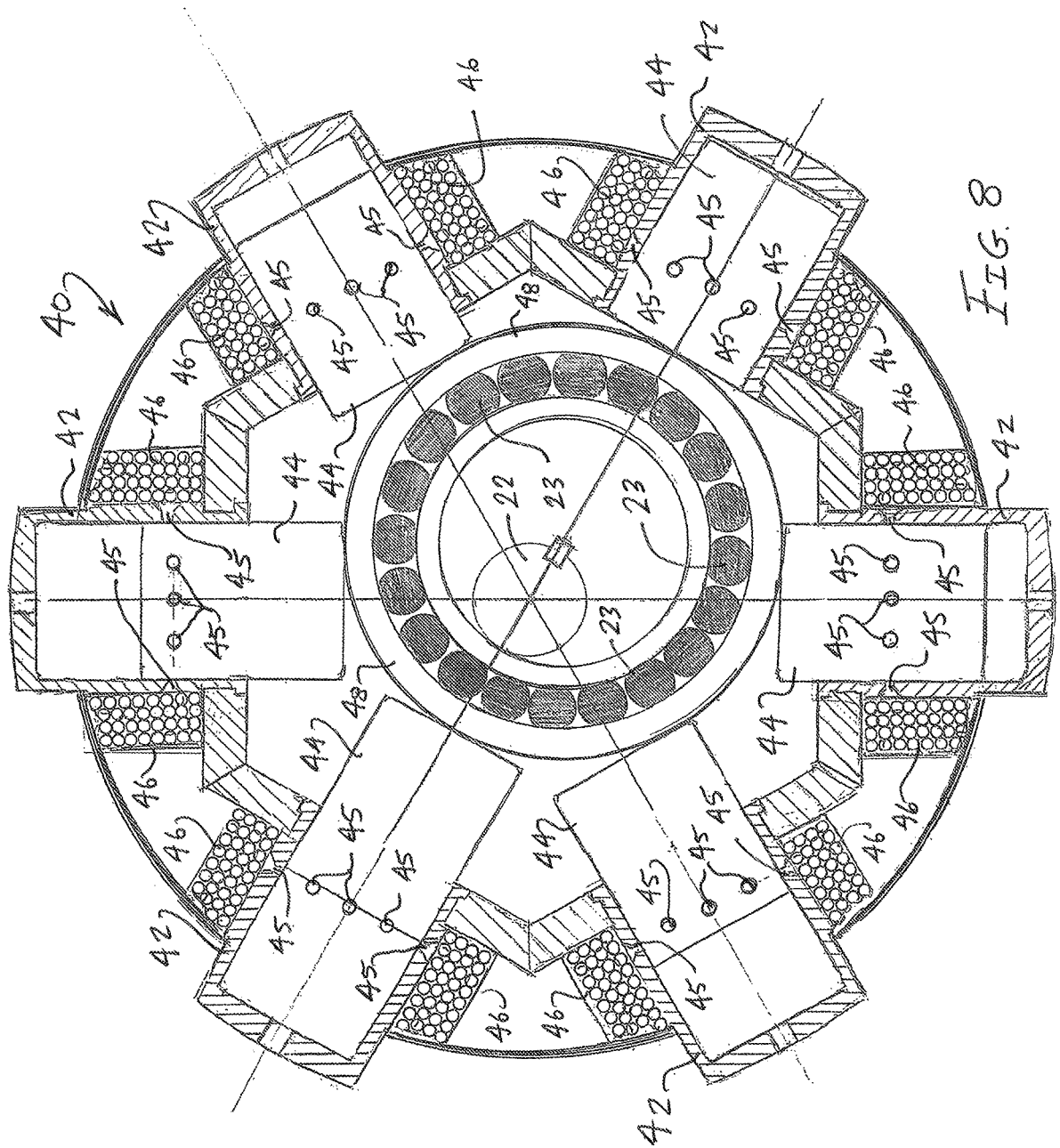
FIG. 8 is a top plan view, shown in partial cross-section, illustrating a rotary valve arrangement in the heat regenerative engine.

Referring to FIG. 8, a rotary valve is operatively engaged with the crank shaft 22 of the heat regenerative engine 20. The cylinders 42 of the engine 20 are arranged in a radial configuration. At higher engine speeds, the steam injection valves are fully opened to inject steam into the cylinders 42, causing piston heads 44 to be pushed radially inward through a power stroke. Movement of the piston heads 44 through the power stroke causes the eccentric ball bearing race 48 to move in an orbital path that causes the crankshaft 22 to rotate, thereby operating the generator 18 (seen in FIG. 4). Recompression occurs on the return stroke of the piston heads 44, increasing the heat of the steam in the port.

What is claimed is:
1. An energy generator system comprising:
a heat regenerative steam engine including a combustion chamber, an arrangement of cylinders with reciprocating pistons and a crank shaft, and the heat regenerative steam engine structured to burn a plurality of different fuels including liquid fuel sources and biomass fuel sources to generate pressurized steam for moving the reciprocating pistons through a power stroke and rotating the crank shaft;

a generator connected to the crank shaft for generating electric power upon operation of the heat regenerative steam engine;

a storage tank for holding biomass and including a delivery mechanism for moving the biomass from the storage tank into the combustion chamber of the heat regenerative steam engine for burning therein to create heat to generate steam;

a liquid fuel tank for holding one or more liquid fuel sources for delivery to the combustion chamber of the heat regenerative steam engine for burning therein to create heat to generate steam;

a thermal storage unit for holding a heat exchange medium and including a hot storage tank and a cold storage tank, and the hot storage tank holding the heat exchange medium after being heated and the cold storage tank holding the heat exchange medium after heat has been extracted from the heat exchange medium, and a heat exchanger within the hot storage tank including a bundle of heat conductive tubes carrying water and steam and surrounding a central auger for moving the heat exchange medium from the hot storage tank to the cold storage tank, wherein heat from the heated heat exchange medium is transferred to the water in the heat conductive tubes, and the heat conductive tubes being directed to the heat regenerative engine for delivering pressurized steam to the arrangement of cylinders and pistons for driving rotation of the crank shaft; and a solar trough including a heat exchange delivery system for moving the cold heat exchange medium from the cold tank through the solar trough for heating the heat exchange medium and delivering the heated exchange medium to the hot storage tank in the thermal storage unit.

* * * * *